US011263128B2

(12) United States Patent
Zhang et al.

(10) Patent No.: US 11,263,128 B2
(45) Date of Patent: Mar. 1, 2022

(54) PACKING OBJECTS BY PREDICTED LIFESPANS IN CLOUD STORAGE

(71) Applicant: Google LLC, Mountain View, CA (US)

(72) Inventors: Wangyuan Zhang, Fremont, CA (US); Sandeep Singhal, Kirkland, WA (US); Sangho Yoon, Palo Alto, CA (US); Guangda Lai, Fremont, CA (US); Arash Baratloo, Mountain View, CA (US); Zhifan Zhang, Mountain View, CA (US); Gael Hatchue Njouyep, Mountain View, CA (US); Pramod Gaud, Mountian View, CA (US)

(73) Assignee: Google LLC, Mountain View, CA (US)

( * ) Notice: Subject to any disclaimer, the term of this patent is extended or adjusted under 35 U.S.C. 154(b) by 480 days.

(21) Appl. No.: 15/795,650

(22) Filed: Oct. 27, 2017

(65) Prior Publication Data

US 2019/0129844 A1    May 2, 2019

(51) Int. Cl.
*G06F 12/02*    (2006.01)
*G06F 16/11*    (2019.01)
*G06F 16/17*    (2019.01)
*G06F 16/182*    (2019.01)
*G06F 16/22*    (2019.01)
*G06F 3/06*    (2006.01)

(52) U.S. Cl.
CPC ........ *G06F 12/0261* (2013.01); *G06F 3/0604* (2013.01); *G06F 3/0608* (2013.01); *G06F 16/122* (2019.01); *G06F 16/1734* (2019.01); *G06F 16/182* (2019.01); *G06F 16/2219* (2019.01); *G06F 3/0649* (2013.01)

(58) Field of Classification Search
CPC ............. G06F 12/0261; G06F 16/2219; G06F 3/0604; G06F 17/30318; G06F 3/0608; G06F 3/0649; G06F 16/182; G06F 16/1734; G06F 16/122
USPC .......................................................... 711/204
See application file for complete search history.

(56) References Cited

U.S. PATENT DOCUMENTS

| | | | |
|---|---|---|---|
| 8,738,882 B2 * | 5/2014 | Post ........................ | G06F 12/02 711/101 |
| 2006/0075007 A1 * | 4/2006 | Anderson ............. | G06F 3/0608 |
| 2008/0256138 A1 * | 10/2008 | Sim-Tang ........... | G06F 11/1435 |
| 2010/0161687 A1 | 6/2010 | Altrichter et al. | |

(Continued)

*Primary Examiner* — David Yi
*Assistant Examiner* — Zubair Ahmed
(74) *Attorney, Agent, or Firm* — Honigman LLP; Brett A. Krueger

(57) ABSTRACT

A method includes receiving data objects, determining a predicted lifespan of each data object, and instantiating multiple shard files. Each shard file has an associated predicted lifespan range. The method also includes writing each data object into a corresponding shard file having the associated predicted lifespan range that includes the predicted lifespan of the respective data object and storing the shard files in a distributed system. The method also includes determining whether any stored shard files satisfy a compaction criteria based on a number of deleted data objects in each corresponding stored shard file. For each stored shard file satisfying the compaction criteria, the method also includes compacting the stored shard file by rewriting the remaining data objects of the stored shard file into a new shard file.

20 Claims, 13 Drawing Sheets

(56) References Cited

U.S. PATENT DOCUMENTS

| | | | |
|---|---|---|---|
| 2014/0136571 A1* | 5/2014 | Bonvin | G06F 17/30318 707/792 |
| 2016/0132786 A1* | 5/2016 | Balan | G06N 99/005 706/12 |
| 2016/0188227 A1 | 6/2016 | Yang et al. | |
| 2016/0357450 A1* | 12/2016 | Rao | G06F 3/0608 |

\* cited by examiner

PACKING OBJECTS BY PREDICTED LIFESPANS IN CLOUD STORAGE

TECHNICAL FIELD

This disclosure relates packing objects stored in cloud storage based on predicted lifespans of the objects

BACKGROUND

Distributed storage systems (e.g., cloud storage) store uploaded data by chunking data objects into corresponding data chunks and aggregating the data chunks into shard files. A shard file may be replicated and stored across multiple storage locations across the distributed system to satisfy data placement, durability, and availability requirements. Generally, data objects of a same policy and uploaded for storage around the same time include corresponding data chunks that get packed/grouped into a same shard file. The storage system may allocate data chunks to a given shard file until a storage threshold is satisfied before creating a new shard file. Further, each shard file may be associated with data objects uploaded by various customers into different storage buckets at around the same time (e.g., within a few hours apart). As a result, a given shard file is likely to include a mixture of short-, medium-, and long-lived objects, thereby inflicting various costs associated with storage overhead and/or computational overhead. While storage systems employ garbage collection to minimize storage overhead by periodically compacting away dead objects within the shard file by rewriting live objects into a new shard file, live objects associated with longer lifespans may be re-written multiple times as the shard files go through a number of compactions to remove short-lived data. While performing garbage collection more frequently minimizes storage overhead by freeing up unused disk-space, computational overhead costs consequently increase due to wasteful rewriting of live data objects to a new shard file during each compaction.

SUMMARY

One aspect of the disclosure provides a method for packing objects by predicted lifespans in cloud storage. The method includes receiving, at data processing hardware, data objects and determining, by the data processing hardware, a predicted lifespan of each data object. The method also includes instantiating, by the data processing hardware, multiple shard files, each shard file having an associated predicted lifespan range. The method further includes writing, by the data processing hardware, each data object into a corresponding shard file having the associated predicted lifespan range that includes the predicted lifespan of the respective data object. The method also includes storing, by the data processing hardware, the shard files in a distributed system and determining, by the data processing hardware, whether any stored shard files satisfy a compaction criteria based on a number of deleted data objects in each corresponding stored shard file. For each stored shard files satisfying the compaction criteria, the method includes compacting, by the data processing hardware, the stored shard file by rewriting the remaining data objects of the stored shard file into a new shard file.

Implementations of the disclosure may include one or more of the following optional features. In some examples, the predicted lifespan ranges of the shard files collectively cover zero to infinite days. The method may also include determining, by the data processing hardware, whether each shard file satisfies a storage criteria. For each shard file satisfying the storage criteria, the method may include storing, by the data processing hardware, the respective shard file in the distributed storage system. The storage criteria may be satisfied when the respective shard file contains a threshold number of data objects or the respective shard file exists for a threshold period of time after instantiation.

In some configurations, determining the predicted lifespan of a respective data object is be based on at least one of a source of the respective data object, a name of the respective data object, a size of the respective data object, or a creation time of the respective data object. Additionally or alternatively, determining the predicted lifespan of a respective data object may include receiving features of the respective data object and classifying the respective data object by executing a classifier on a machine learning model trained on a dataset of previously received data objects using the received features as inputs for the classification. The machine learning model may include a random forest predictive model and/or a neural net based predictive model. This configuration may include at least one of the following features: a data bucket name for a data bucket holding the respective data object, the data bucket name being user specific at a bucket creation time; a historical lifespan pattern for past data objects in the data bucket; an upload time corresponding to when the respective data object was uploaded to the data bucket; an upload location indicating a location of the respective data object within the distributed system; a size of the respective data object; or a storage class of the respective data object, each storage class having a different level of data availability.

In some implementations, the compaction criteria is satisfied when the associated predicted lifespan range of the stored shard file has expired, a majority of the data objects of the stored shard file have been deleted, or all of the data objects of the stored shard file have been deleted. Rewriting the remaining data objects of the stored shard file into the new shard file may include identifying, by the data processing hardware, non-deleted, live data chunks that are constituents of the remaining data objects of the stored shard file. Rewriting the remaining data objects of the stored shard file into the new shard file may also include associating, by the data processing hardware, the non-deleted, live data chunks with the new shard file.

Another aspect of the disclosure provides a system for packing objects by predicted lifespans in cloud storage. The system includes data processing hardware and memory hardware in communication with the data processing hardware. The memory hardware stores instructions that when executed on the data processing hardware cause the data processing hardware to perform operations. The operations include receiving data objects and determining a predicted lifespan of each data object. The operations also include instantiating multiple shard files. Each shard file has an associated predicted lifespan range. The operations further include writing each data object into a corresponding shard file having the associated predicted lifespan range that includes the predicted lifespan of the respective data object and storing the shard files in a distributed system. The operations also include determining whether any stored shard files satisfy a compaction criteria based on a number of deleted data objects in each corresponding stored shard file. For each stored shard files that satisfy the compaction criteria, the operations include compacting the stored shard file by rewriting the remaining data objects of the stored shard file into a new shard file.

Implementations of the disclosure may include one or more of the following optional features. In some implementations, the predicted lifespan ranges of the shard files collectively cover zero to infinite days. The operations may include determining whether each shard file satisfies a storage criteria. For each shard file satisfying the storage criteria, the operations may include storing the respective shard file in the distributed storage system. The storage criteria may be satisfied when the respective shard file contains a threshold number of data objects or the respective shard file exists for a threshold period of time after instantiation.

In some examples, determining the predicted lifespan of a respective data object is based on at least one of a source of the respective data object, a name of the respective data object, a size of the respective data object, or a creation time of the respective data object. Optionally, determining the predicted lifespan of a respective data object may also include receiving features of the respective data object and classifying the respective data object by executing a classifier on a machine learning model trained on a dataset of previously received data objects using the received features as inputs for the classification. The machine learning model may include a random forest predictive model and/or a neural net based predictive model. In this example, the features may include at least one of the following: a data bucket name for a data bucket holding the respective data object, the data bucket name being user specific at a bucket creation time; a historical lifespan pattern for past data objects in the data bucket; an upload time corresponding to when the respective data object was uploaded to the data bucket; an upload location indicating a location of the respective data object within the distributed system; a size of the respective data object; or a storage class of the respective data object, each storage class having a different level of data availability.

In some configurations, the compaction criteria is satisfied when the associated predicted lifespan range of the stored shard file has expired, when a majority of the data objects of the stored shard file have been deleted, or when all of the data objects of the stored shard file have been deleted. Additionally or alternatively, rewriting the remaining data objects of the stored shard file into the new shard file may include by the data processing hardware, non-deleted, live data chunks that are constituents of the remaining data objects of the stored shard file and associating, by the data processing hardware, the non-deleted, live data chunks with the new shard file.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1A:
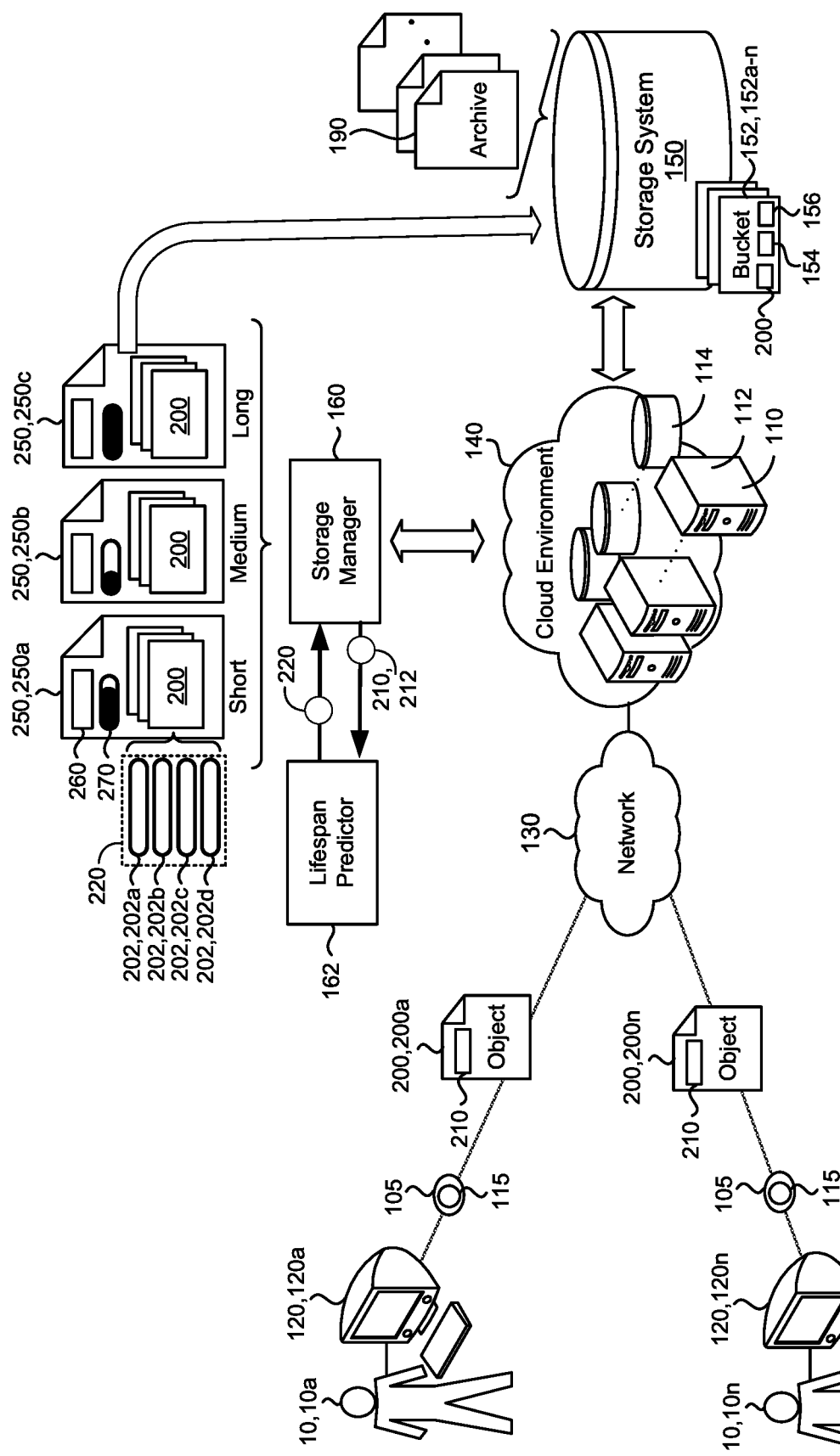
FIG. 1A is a schematic view of an example system for writing a data object into a corresponding shard file based on a predicted lifespan of the data object.

Implementations herein are directed toward predicting lifespans of data objects uploaded to a distributed storage system (e.g., cloud storage) and grouping each data object into a corresponding shard file associated with the predicted lifespan of the data object. A storage manager of the storage system may open/instantiate multiple shard files at a given time, whereby each shard file has an associated predicted lifespan range for storing data chunks of one or more objects each having a predicted lifespan that falls within the associated predicted lifespan range. Accordingly, the shard files may collectively encompass predicted lifespans from zero days to infinite days. In some examples, the storage manager instantiates a short-lived shard file having an associated predicted lifespan range of less than two weeks, a medium-lived shard file having an associated predicted lifespan range between two (2) weeks and four (4) weeks, and a long-lived shard file having an associated predicted lifespan range from four (4) weeks to infinity. The storage manager may instantiate any number of shard files such that a greater number of open shard files provides higher granularity for grouping data objects and a lower number of open shard files provides a more course grouping of lifespans.

When a customer/owner deletes a data object from the storage system, constituent data chunks of the deleted object become unreferenced within the corresponding shard file. In order to free-up storage capacity taken by dead (e.g., unreferenced) data chunks after the corresponding data object is deleted, implementations include performing garbage collection by triggering compaction on a given shard file only after the predicted lifespans of all the objects written to the shard file lapse. Other implementations include triggering compaction on a given shard file when the associated predicted lifespan range of the shard file has expired, when a majority of the data objects in the shard file have been deleted, or after all of the data objects in the shard file have been deleted. In fact, triggering compaction on a given shard filed may occur after a threshold percentage of data objects in the shard file have been deleted. For instance, the threshold percentage may be user-specified and/or may be dynamic such that the value set for the threshold percentage is self-learning and updates based on historical information in order to maximize metrics for compaction of stored shard files in the storage system. Compacting the shard file based on the predicted lifespans of the data objects therein substantially alleviates the wasting of computational resources required for recursively rewriting live data chunks to new shard files. Compaction may include rewriting each non-deleted, live data chunk that are constituents of the remaining data objects of the shard file into a new smaller shard file. However, other options may include rewriting non-deleted, live data chunks that are constituents of remaining data objects of two or more different shard files into a new shard file. By rewriting remaining data objects from different shard files into a new shard file, the storage system may be optimized to handle shard files of a minimum file size and/or meet storage system constrains limiting the total number of total shard files in existence at a given time.

Figure 1B:
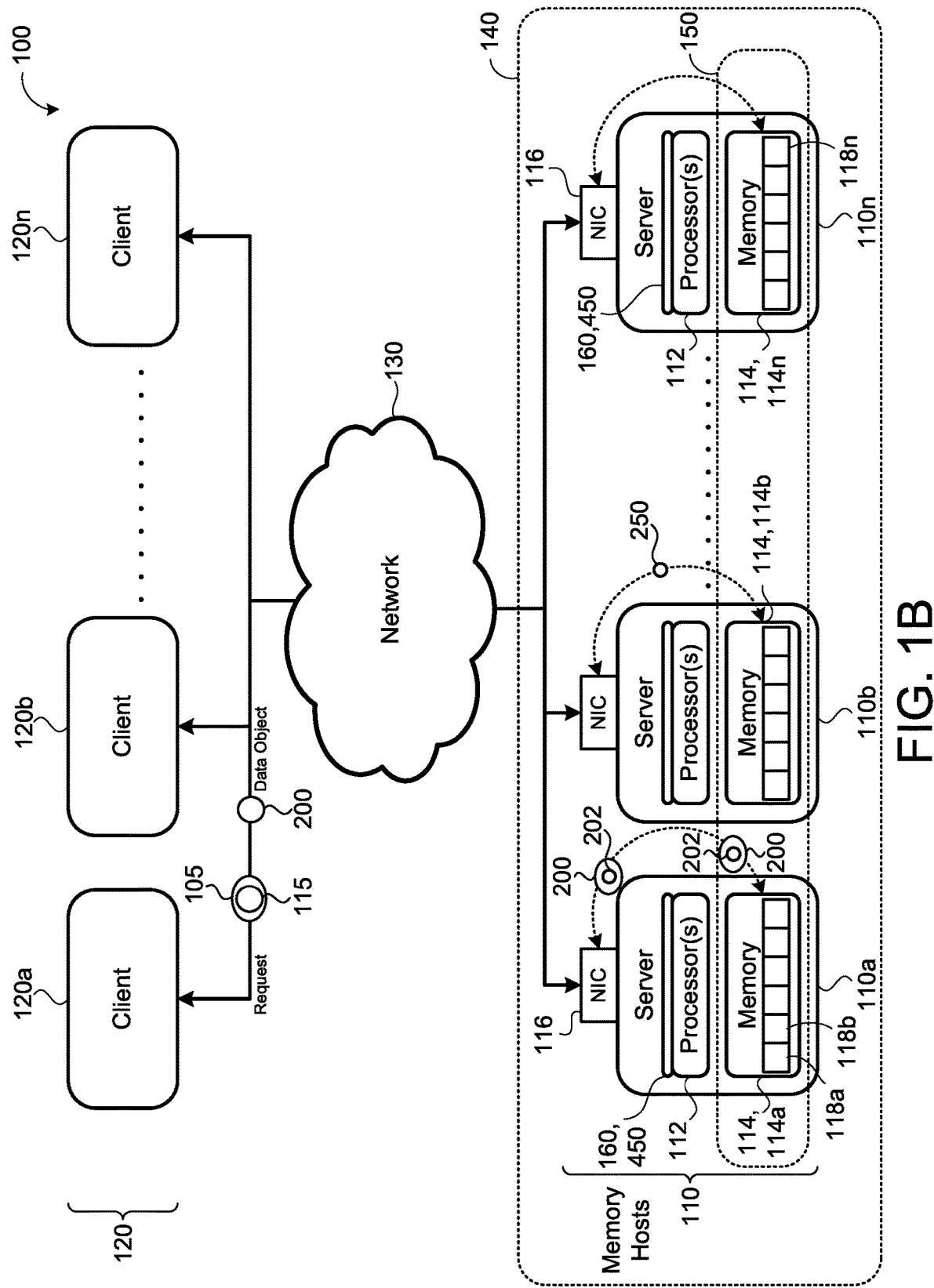
FIG. 1B is a schematic view of an example system for writing data objects into corresponding shard files based on predicted lifespans of the data objects and storing the shard files on memory hardware of a distributed storage system.

Referring to FIGS. 1A and 1B, in some implementations, a system 100 includes one or more client devices 120, 120a-n associated with one or more clients/customers/owners 10, 10a-n, who may communicate, via a network 130, with a remote system 140. The remote system 140 may be a distributed system (e.g., cloud environment) having scalable/elastic resources 110. The resources 110 include computing resources 112 and/or storage resources 114. A storage abstraction 150 (e.g., (e.g., a distributed storage system or a data store) is overlain on the storage resources 114 to allow scalable use of the storage resources 114 by one or more of the client devices 120. The storage abstraction 150 is configured to store data objects 200, 200a-n from the client devices 120. A data object 200 (interchangeably referred to as a "blob") may include any unstructured data such as a photo, video, file, document, etc. The storage abstraction 150 includes a collection of buckets 152, 152a-n each configured as a basic container for holding data objects 200 uploaded by a client device 120. For instance, each client device 120 may create one or more buckets 152 to organize their data and control access to their data. When creating a bucket 152, the client device 120 may specify a name (e.g., bucket identifier 154), a storage class, and geographic location of the storage resources 114 storing the bucket 152. All of the buckets 152 share a single global namespace in the storage abstraction 150, and therefore each bucket 152 includes an associated bucket identifier 154 (e.g. bucket name) that is unique.

Figure 2:
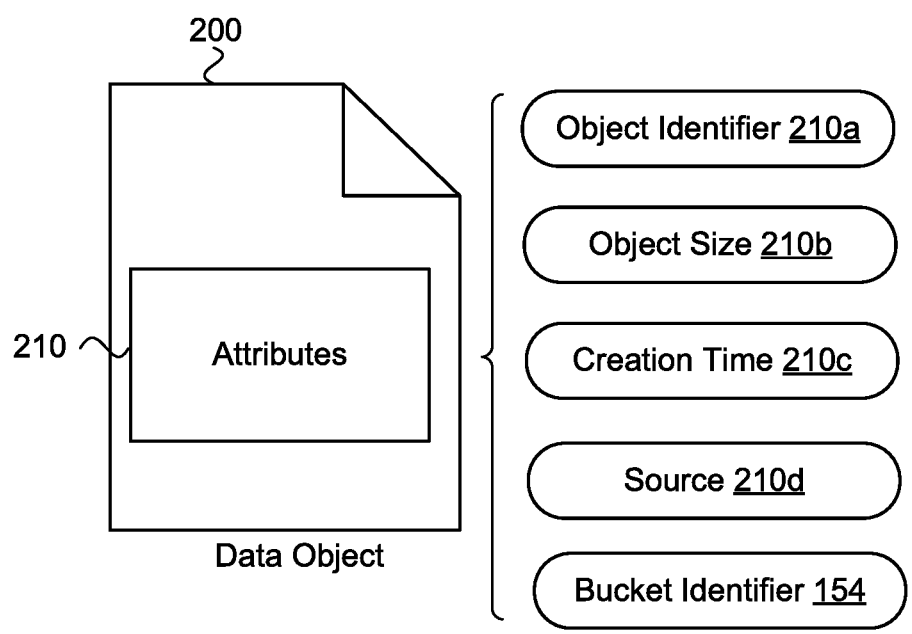
FIG. 2 provides a schematic view of attributes associated with a data object.

Each data object 200 may be associated with one or more attributes 210. The attributes 210 may also be referred to as features. Referring to FIG. 2, in some implementations, the attributes 210 of the data object 200 include at least one of an object identifier 210a, a size 210b, a creation time 210c, a source 210d, and the bucket identifier 154 identifying the bucket 152 on the storage abstraction 150 that is configured to hold/contain the data object 200. The object identifier 210a includes a name of the data object 200. Unlike each bucket 152 including a unique bucket identifier 154 across the single global namespace, the object identifier 210a may reside in a flat namespace within the corresponding bucket 152 such that different buckets 152 can include data objects 200 having the same object identifier 210a. The object identifier 210a may collectively include the name of the data object 200 as well as the bucket identifier 154 for the corresponding bucket 152. The size 210b may indicate the size of the data object 200 in bytes or some other parameter. The creation time 210c may indicate an upload time including a timestamp of when the data object 200 is uploaded into the corresponding bucket 152. Here, the creation time 210c may include an hour of a day, day of a week, and/or day of a month when the data object 200 is uploaded into the bucket 152 on the storage abstraction 150. The source 210d includes an identifier of the client device 120 that uploaded the data object 200 into the corresponding bucket 152 for storage on the data abstraction 150. The source 210d may additionally or alternatively indicate user/customer/entity 10 that owns the data object 200 and/or the geographical location (e.g., U.S. East or U.S. West) where the data object 200 uploads from. The geographical location can be a fine-grained metropolitan name, such as Detroit Metropolitan Area, or a coarse grained region, such as U.S. West.

Referring back to FIGS. 1A and 1B, in some implementations, the remote system 140 executes a storage manager 160 for managing uploading of data objects 200 to the storage abstraction 150 and deleting data objects 200 from the storage abstraction 150. When uploading a data object 200 into a bucket 152 for storage on the storage abstraction 150, a client device 120 sends an upload request 105 specifying the bucket identifier 154 associated with the bucket 152 that the client device 120 wants to hold the data object 200. Data objects 200 uploaded onto the storage abstraction 150 are immutable throughout a storage lifespan of the data object 200, and therefore do not change unless the data object 200 is deleted. In some examples, a client device 120 deletes a data object 200 stored on the storage abstraction 150 by sending a deletion request 115 identifying the data object 200. For instance, the deletion request 115 may include the object identifier 210a (FIG. 2) associated with the deleted data object 200. Accordingly, each data object 200 stored on the storage abstraction 150 includes a corresponding lifespan that includes a timespan between a successful object creation time (e.g., upload) and successful object deletion. The object creation time 210c may be provided as one of the attributes 210 when uploading the data object 200. A bucket 152 may maintain a historical object lifespan table 156 indicating the creation time 210c for each data object 200 uploaded into the bucket 152 and a deletion timestamp indicating a time for each data object 200 that is deleted from the bucket 152.

The storage manager 160 receives data objects 200 from a client device 120 and stores the data objects 200 on the storage abstraction 150 by chunking the data objects 200 into constituent data chunks 202 and aggregating the data chunks 202 into shard files 250. As used herein, a shard file 250 includes a unit of data that is migrated and/or replicated to satisfy data placement, durability, and availability requirements of memory locations 118 on the memory hardware 114 of the storage abstraction 150. In some examples, the storage manager 160 instantiates two or more shard files 250, 250a-c with each shard file 250 having an associated predicted lifespan range 260. In the example shown, the storage manager 160 instantiates shard file 250a having a short-lived predicted lifespan range 260, shard file 250b having a medium-lived predicted lifespan range 260, and shard file 250c having a long-lived predicted lifespan range 260. In some examples, the predicted lifespan range 260 of the first shard file 250a is from zero (0) to two (2) weeks, the predicted lifespan range 260 of the second shard file 250b is from two (2) weeks to four (4) weeks, and the predicted lifespan range 260 of the third shard file 250c is from four (4) weeks to infinity. The storage manager 160 may instantiate/open any number of shard files 250 with corresponding predicted lifespan ranges 260 based on traffic patterns and storage requirements for data placement, durability, and/or availability requirements of the storage abstraction 150. The number of instantiated/open shard files 250 temporarily buffer on memory and then eventually permanently persist to hard disc within the storage abstraction 150. Moreover, the storage manager 160 may configure/set a value for the lower lifespan boundary and/or a value for the upper lifespan boundary for each associated predicted lifespan range 260. Generally, the more fine-grained the lifespan categorization is for instantiated shard files 250, the more efficient garbage collection (e.g., compaction routine 450) will become.

In some implementations, the storage manager 160 provides the attributes 210 for each data object 200 to a lifespan predictor 162 (i.e., executing on the data processing hardware 112 of the remote system 140) configured to determine a predicted lifespan 220 for the data object 200 based on one or more of the attributes 210. As used herein, the term "predicted lifespan" refers to a predicted number of days that a data object 200 may live. In the example shown, the lifespan predictor 162 returns the predicted lifespan 220 for the data object 200 back to the storage manager 160 and the storage manager 160 writes the data object 200 into the corresponding shard file 250 having the associated predicted lifespan range 260 that includes the predicted lifespan 220 of the respective data object 200. For instance, if the predicted lifespan 220 for the data object 200 is specific number of days (e.g., a lifespan predicted to be 16 days), the storage manager 160 may write the respective data object 200 to the second shard file 250b having the medium-lived predicted lifespan range 260 (e.g., from 14 days to 28 days). In other examples, the predicted lifespan 220 output from the lifespan predictor 162 includes a designated category (e.g., lifespan range) that the corresponding data object 200 falls into. For instance, the predicted lifespan 220 for each data object 200 may indicate that the data object 200 includes one of a short-lived, medium-lived, or long-lived predicted lifespan.

Conventional techniques for storing data objects simply pack all data objects uploaded at around the same time and under a same policy into a single shard file. Here, data objects uploaded by various customers into different buckets are likely to have diverse lifespans within the single shard file. The shard file may be stored once a storage threshold is reached. As a result, performing garbage collection by compacting the shard file to remove dead chunks associated with short-lived deleted data objects, consequently requires live chunks associated with remaining data objects being re-written over and over during each compaction. Thus, increasing the frequency of compaction on a single shard file will increase storage capacity at a cost of increased computations to re-write live chunks to new shard files, while decreasing the frequency of compaction on the shard file will decrease computational costs at a cost of decreased storage capacity. As will become apparent, instantiating multiple shard files 250, each having a respective predicted lifespan range 260, allows for compaction of each shard file 250 independently of the other shard files 250 based on the predicted lifespan 220 of the data objects 200 written thereto. This alleviates the burden of having to unduly re-write live chunks 202 to new shard files over and over for each compaction.

With continued reference to FIG. 1A, multiple data objects 200 are written to each shard file 250, 250a-c based on the predicted lifespans 220 of the data objects 200. More specifically, the storage manager 160 may write each chunk 202 for an associated data object 200 to the shard file 250 having the predicted lifespan range 260 that includes the predicted lifespan 220 of the data object 200. In the example shown, one of the data objects 200 written to the short-lived shard file 250a includes four data chunks 202, 202a-d. In other examples, a data object 200 written to a shard file 250 may include more than four or less than four data chunks 202.

In some implementations, the storage manager 160 appends data chunks 202 into the corresponding shard file 250 until a corresponding storage criteria 270 associated with the shard file 250 is satisfied. When the storage criteria 270 of the shard file 250 is satisfied, the storage manager 160 stores the shard file 250 in the storage abstraction 150 (e.g., distributed storage system) (i.e., shard file 250 is permanently persisted on hard disk within the storage abstraction 150) and subsequently instantiates a new shard file 250 having the same predicted lifespan range 260. By storing a shard file 250 in the storage abstraction 150 when the corresponding storage criteria 270 is satisfied, the storage manager 160 finalizes/closes the shard file 250 in the storage abstraction 150 so that the shard file 250 becomes immutable and no longer accepts any new data objects 200. In the example shown, storage criteria 270 for the third shard file 250c having the long-loved predicted life span range 260 is satisfied, thereby resulting in the third shard file 250c being stored in the storage abstraction 150. In some examples, the storage criteria 270 is satisfied when the respective shard file 250 contains a threshold number of data objects/chunks 200, 202. In other examples, the storage criteria 270 is satisfied when the respective shard file 250 exists for a threshold period of time after instantiation. The storage criteria 270 may be satisfied when the earlier one of the respective shard file 250 contains the threshold number of data objects/chunks 200, 202 or has existed for the threshold period of time after instantiation.

Referring to FIG. 1B, in some implementations, the distributed system 140 includes loosely coupled memory hosts 110, 110a-n (e.g., computers or servers), each having a computing resource 112 (e.g., one or more processors or central processing units (CPUs)) in communication with storage resources 114 (e.g., memory hardware, memory hardware, flash memory, dynamic random access memory (DRAM), phase change memory (PCM), and/or disks) that may be used for caching data. The storage abstraction 150 overlain on the storage resources 114 allows scalable use of the storage resources 114 by one or more client devices 120, 120a-n. The client devices 120 may communicate with the memory hosts 110 through the network 130 (e.g., via remote procedure calls (RPC)).

In some implementations, the distributed system 140 is "single-sided." "Single-sided" refers to the method by which most of the request processing on the memory hosts 110 may be done in hardware rather than by software executed on CPUs 112 of the memory hosts 110. Additional concepts and features related to a single-sided distributed caching system can be found in U.S. Pat. No. 9,164,702, which is hereby incorporated by reference in its entirety.

The distributed system 140 may store constituent data chunks 202 of data objects 200 uploaded by client devices 120 into corresponding buckets 152 on the storage resources 114 (e.g., memory hardware) of the remote memory hosts 110 (e.g., storage abstraction 150) and get the data chunks 202 from the remote memory hosts 110 via RPCs or via remote direct memory access (RDMA)-capable network interface controllers (NIC) 116. A network interface controller 116 (also known as a network interface card, network adapter, or LAN adapter) may be a computer hardware component that connects a computing device/resource 112 to the network 130. Both the memory hosts 110a-n and the client device 120 may each have a network interface controller 116 for network communications. The storage manager 160 executing on the physical processor 112 of the hardware resource 110 registers a set of remote direct memory accessible registers a set of remote direct memory accessible regions/locations 118, 118a-n of the storage resource (e.g., memory) 114 with the network interface controller 116. Each memory location 118 is configured to store a corresponding data chunk 202.

The storage manager 160 may further store shard files 250 when a storage criteria 270 of the respective shard file 250 is satisfied and execute a compaction routine 450 (e.g., garbage collection) for each stored shard file 250 satisfying compaction criteria 280. The compaction criteria 280 may be satisfied when the associated predicted lifespan range 260 of the stored shard file 250 has expired, a majority of the data objects 200 of the stored shard file 250 have been deleted, or all of the data objects 200 of the stored shard file 250 have been deleted. For example, the compaction criteria 280 may include a threshold percentage of data objects in the shard file that must be deleted in order to trigger execution of the compaction routine 450. For instance, a threshold percentage of 51-percent (51%) would require that a majority of the data objects 200 of the stored shard file 250 be deleted before the compaction routine 450 executes, while a threshold percentage of 100-percent (100%) would require that all of the data objects 200 be deleted before triggering garbage collection for the corresponding stored shard file 250. The threshold percentage may optionally include values less than or equal to 50-percent (50%). In some examples, the value for the compaction criteria 280 (e.g., threshold percentage) is user-specified and/or dynamic such that the value is self-learning and updates based on historical information in order to maximize metrics for compacting stored shard files 250 in the storage abstraction 150. The compaction routine 450 may include compacting the stored shard file 250 by rewriting the remaining data objects 200 of the stored shard file 250 into a new shard file 250. The compaction routine 450 effectively removes dead chunks 202 that are constituents of data objects 200 that have been deleted from the storage resource 114 by the client device 120, e.g., via a delete request 115.

Figure 3A:
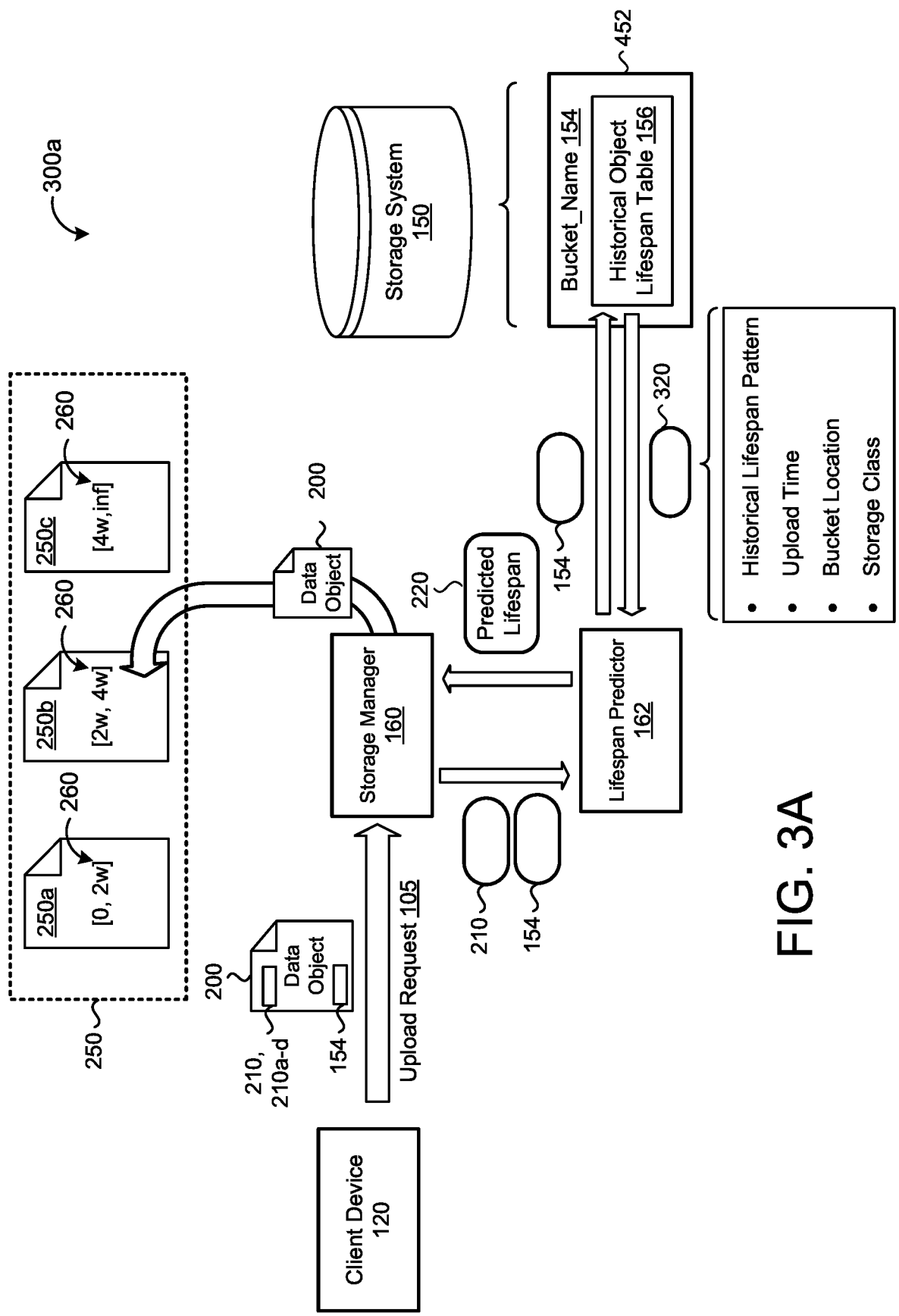
FIG. 3A is a schematic view of a storage manager of the system of FIG. 1 writing a received data object into a corresponding shard file having an associated predicted lifespan range.
Figure 3B:
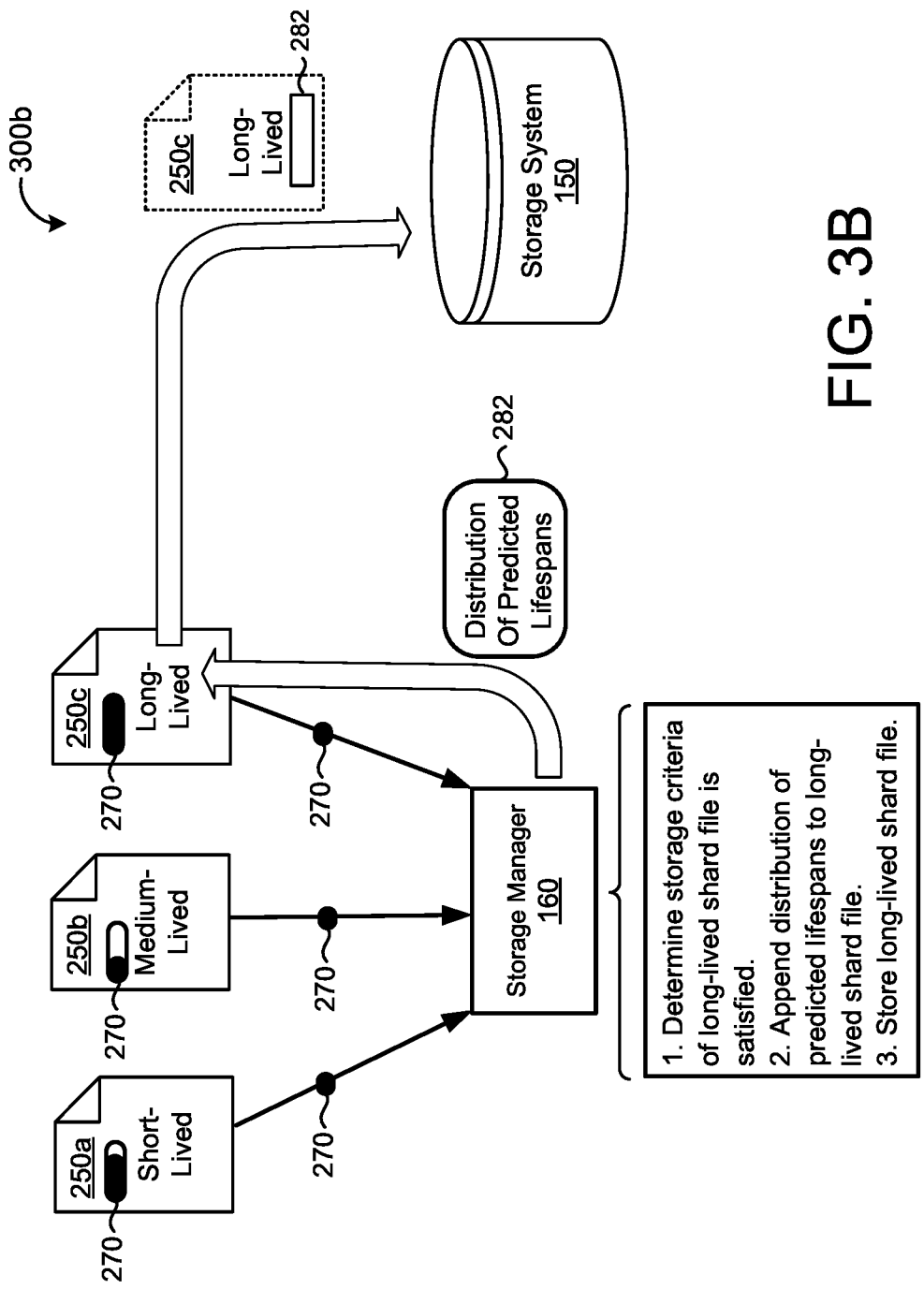
FIG. 3B is a schematic view of the storage manager of the system of FIG. 1 storing a shard file on memory hardware of a distributed storage system when the shard file satisfies storage criteria.

FIGS. 3A and 3B show schematic views 300a, 300b of the storage manager 160 writing a received data object 200 into a corresponding shard file 250 having an associated predicted lifespan range 260 and storing the shard file 250 in a distributed storage system 150 (e.g., storage abstraction). Referring to FIG. 3A, the storage manager 160 receives an upload request 105 from a client device 120 to store the data object 200 on the storage abstraction 150. The storage manager 160 also instantiates multiple shard files 250, 250a-c each having an associated predicted lifespan range 260. In the example shown, the first instantiated shard file 250a is short-lived and includes an associated predicted lifespan range 260 from zero days to two weeks [0, 2 w], the second instantiated shard file 250b is medium-lived and includes an associated predicted lifespan range 260 from two weeks to four weeks [2 w, 4 w], and the third instantiated shard file 250c is long-lived and includes an associated predicted lifespan range 260 from four weeks to infinity [4 w, inf]. Thus, the storage manager 160 may instantiate multiple shard files 250 to collectively cover zero to infinite days.

In response to receiving, the data object 200 via the upload request 105, the storage manager 160 consults the lifespan predictor 162 to determine a predicted lifespan 220 for the data object 200. For instance, the storage manager 160 may construct a remote procedure call (RPC) request to query the lifespan predictor 162 to return a predicted lifespans 220. In some examples, the storage manager 160 provides the attributes 210, 210a-d of the received data object 200 to the lifespan predictor 162 in the RPC request and the lifespan predictor 162 uses one or more of the attributes 210 and the bucket identifier 154 to determine the predicted lifespan 220 for the respective data object 200. The attributes 210 of the data object 200 include at least one of the object identifier 210a, the size 210b of the respective data object 200, the creation time 210c of the respective data object 200, the source 210d of the respective data object, or the bucket identifier 154 identifying the bucket 152 on the storage abstraction 150 that is configured to hold/contain the data object 200.

In the example shown, the lifespan predictor 162 queries the storage abstraction (e.g., distributed storage system) 150 to obtain one or more bucket features 320 associated with the bucket 152 for holding the data object 200. For instance, the lifespan predictor 162 may query the storage abstraction 150 using the bucket identifier 154 to obtain the bucket features 320 of the respective bucket 152. For instance, the bucket 152 maintains an associated historical object lifespan table 156 indicating the creation time 210c for each data object 200 uploaded into the bucket 152 and a deletion timestamp indicating a time for each data object 200 that is deleted from the bucket 152. The bucket features 320 may include a historical lifespan pattern for past data objects 200 in the respective data bucket. The historical lifespan pattern may be compiled from the historical object lifespan table 156 maintained by the respective bucket 152 that indicates the creation time 210c for each past data object 200 uploaded into the bucket 152 and a deletion timestamp indicating a deletion time for each data object 200 deleted from the bucket 152. Accordingly, the historical lifespan pattern may include an average, mean and/or standard deviation of object lifespan distributions of the respective bucket 152. The bucket features 320 may further include a bucket location (e.g., a regional location) indicating a location (e.g., a geographical location) of where the respective bucket 152 and its data objects 200 are stored and a storage class of the respective data object. The bucket location specifies a geographical location of a memory host 110 (e.g., severs) and associated memory hardware 114 storing the respective bucket 152. The bucket location may be regional, specifying a geographical place (e.g. Detroit, Mich.), or multi-regional specifying a general geographical area (e.g., the United States). The bucket features 320 may optionally include an upload location of the data object 200 when the data object 200 is uploaded to the bucket 152. The upload location may additionally are alternatively be provided in the attributes 202 of the received data object 200. Each storage class may have a different level of data availability. The storage class may be multi-regional storage, regional storage, near line storage, and cold line. In some examples, the bucket 152 holding the data object 200 has a default storage class specified when the bucket 152 was created and any objects 200 added to the bucket 152 use the associated default storage class unless specified otherwise. In other implementations, the storage manager 160 obtains/receives the bucket features 320 and provides the bucket features 320 to the lifespan predictor 162 in the RPC request.

In some implementations, the lifespan predictor 162 uses one or more of the attributes 210 of the data object 200 and/or one or more of the bucket features 320 obtained from the bucket 152 configured to hold/contain the data object 200 in order to determine the predicted lifespan 220 of the data object 200. The bucket historical pattern included in the bucket features 320 may provide the lifespan predictor 162 with several strong indicators for predicting object lifespans because the bucket 152 may serve as a container for storing a collection of logically related data objects 200. For instance, if many past data objects 200 in the respective bucket 152 were all deleted around 21 days after being uploaded into the respective bucket 152, the lifespan predictor 162 determines that there is a high probability that the data object 200 will also likely include a lifespan of about 21 days since the data object 200 is being uploaded to the same bucket 152.

In some examples, the lifespan predictor 162 executes a classifier on a machine learning model trained on a dataset of previously received data objects 200 (appended to previously stored shard files 250) using the received features 320 and/or attributes 210 as inputs for the classification. In these examples, the lifespan predictor 162 classifies the respective data object 200 by executing the classifier on the machine learning model and may determine the predicted lifespan 220 of the respective data object 200 based on the lifespan distributions of the data objects appended to the previously stored shard files that include similar bucket features 320 and/or attributes 210. The machine learning model may include a random forest predictive model and/or a neural net based predictive model. Additionally or alternatively, the machine learning model of the classifier executing on the lifespan predictor 162 may collect training data from an object metadata table that includes key-value pairs where key is the object identifier 210a and the bucket identifier 154 and value is the object metadata containing various metadata information for data object 200 associated with the object identifier 210a and the bucket identifier 154. Here, the object metadata may update each time a data object 200 gets deleted by its owner. Here, the training data used by the machine learning model includes a training data record that contains the received features 320 and/or attributes 210 for the deleted data object 200 along with an actual lifespan of the deleted data object 200 (e.g. in days).

With continued reference to FIG. 3A, the lifespan predictor 162 returns the predicted lifespan 220 for the data object 200 to the storage manager 160 and the storage manager 160 writes the data object 200 to the shard file 250 having the associated predicted lifespan range 260 that includes the predicted lifespan 220 for the data object 200. In the example shown, the lifespan predictor 162 determines the predicted lifespan 220 to be twenty-one (21) days, and therefore, the storage manager 160 writes the data object to the second instantiated shard file 250b having the associated predicted lifespan range from two weeks to four weeks [2 w, 4 w].

FIG. 3B shows the storage manager 160 determining whether each of the instantiated shard files 250a-c satisfies a storage criteria 270 for storing each respective shard file 250a-c. Namely, the storage manager 160 may continue to append data objects 200 into each shard file 250 until the respective storage criteria 270 of the respective shard file 250 satisfied. In some examples, the storage criteria 270 for a respective shard file 250 is satisfied when the respective shard file 250 contains a threshold number of data objects 200 and/or data chunks 202. In other examples, the storage criteria 270 for a respective shard file 250 is satisfied when the respective shard file 250 contains exists for a threshold period of time after instantiation. The storage criteria 270 may be satisfied upon the earlier one of the respective shard file 250 reaching storage capacity (e.g., containing the threshold number of data objects/chunks 200, 202 or the respective shard file 250 existing for the threshold period of time after instantiation. The storage criteria 270 for each instantiated shard file 250 may be the same or at least one of the shard files 250 may include a different storage criteria 270.

Upon determining that the storage criteria 270 of a respective shard file 250 is satisfied, the storage manager 160 may seal the respective shard file 250 and append a distribution of predicted lifespans 282 to the respective shard file 250. The distribution of predicted lifespans 282 may provide the predicted lifespan 220 determined for each data object 200 written to the respective shard file 250. Thereafter, the storage manager 160 may store the respective shard file 250c having the distribution of predicted lifespans 282 appended thereto on the storage abstraction 150 (e.g., distributed storage system). The storage manager 160 may use the distribution of predicted lifespans 282 for determining when to compact the respective shard file 250c stored on the storage abstraction. In the example shown, the storage manager 160 determines that the third instantiated shard file 250c satisfies the storage criteria 270, appends the distribution of predicted lifespans 282 to the third shard file 250, and then stores the third shard file 250c on the storage abstraction 150. The storage manager 160 may simultaneously or consecutively instantiate a new shard file 250 that is long-lived and having an associated predicted lifespan range 260 from four weeks to infinity [4 w, inf].

The advantage of packing/writing data objects 200 by predicted lifespan 220 into corresponding shard files 250 having associated predicted lifespan ranges 260 reveals a predicted file lifespan for each shard file 250 once stored on the distributed storage system 150. The predicted file lifespan for a given stored shard file 250 may be inferred from the distribution of predicted lifespans 282 associated with that shard file 250 and may indicate when the entire shard file can be recycled (e.g., compacted), assuming perfect prediction of the lifespans. FIGS. 4A-4F show a schematic views 400a, 400b, 400c, 400d, 400e, 400f of the storage manager 160 compacting each of the short-lived shard file 250a and the long-lived shard file 250c when respective compaction criteria 280 of the shard files 250a, 250c is satisfied. The short-lived shard file 250a stored on the storage abstraction 150 has the associated predicted lifespan range 260 from zero days to two weeks [0, 2 w]. As shown in FIG. 4B, the short-lived shard file 250a includes data object 200a having data chunks 202aa, 202ab and data object 200b having data chunks 202ba, 202ba. The long-lived shard file 250c stored on the storage abstraction 150 has the associated predicted lifespan range 260 from four weeks to infinity [4 w, inf]. As shown in FIG. 4D, the long-lived shard file 250c includes data object 200c having data chunks 202ca, 202cb, data object 200d having data chunks 202da, 202db, and data object 200e having data chunks 202ea, 202eb.

Figure 4A:
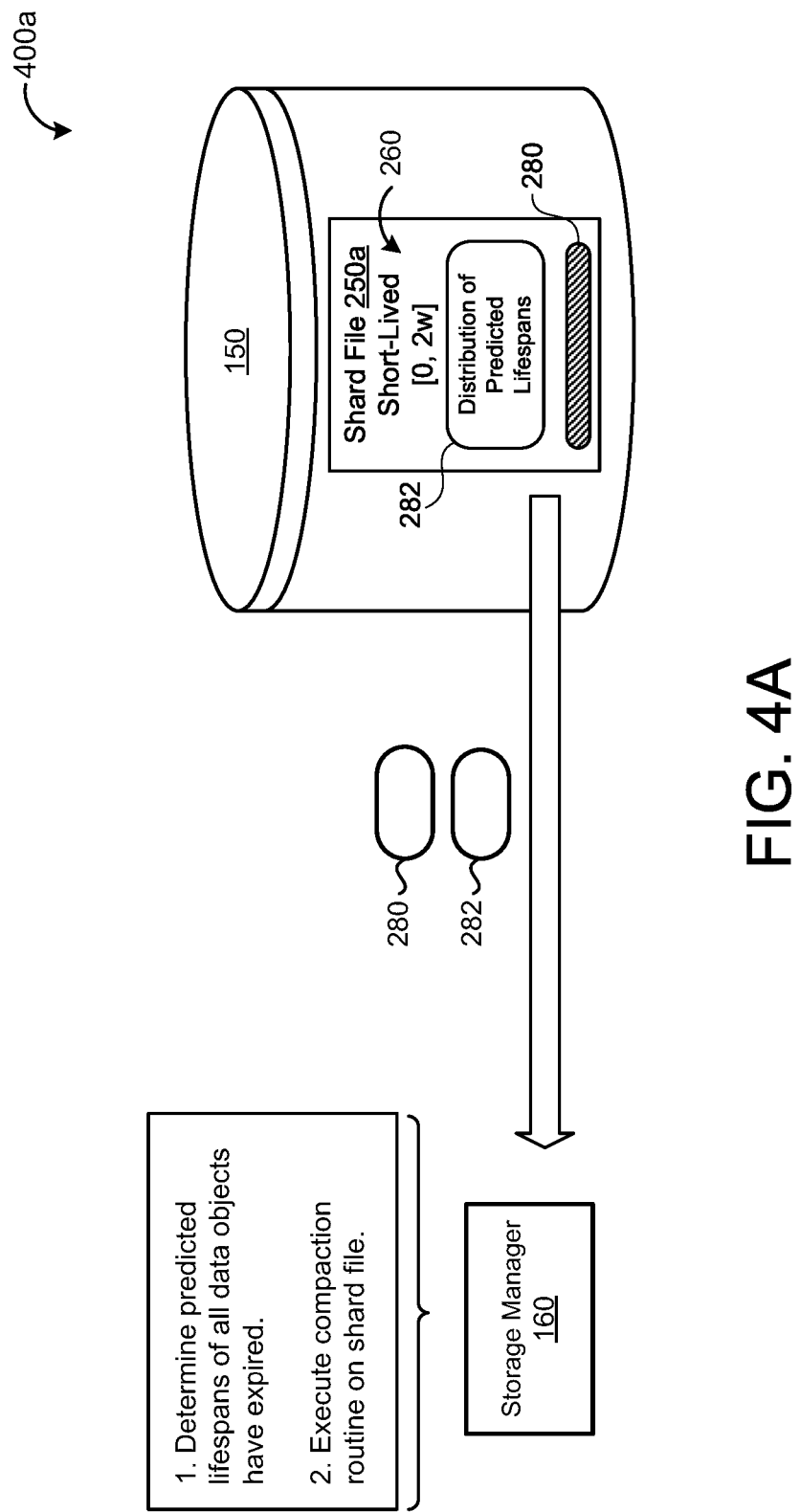
FIGS. 4A-4F are schematic views of the storage manager of the system of FIG. 1 executing a compaction routine on stored shard files satisfying compaction criteria.
Figure 4B:
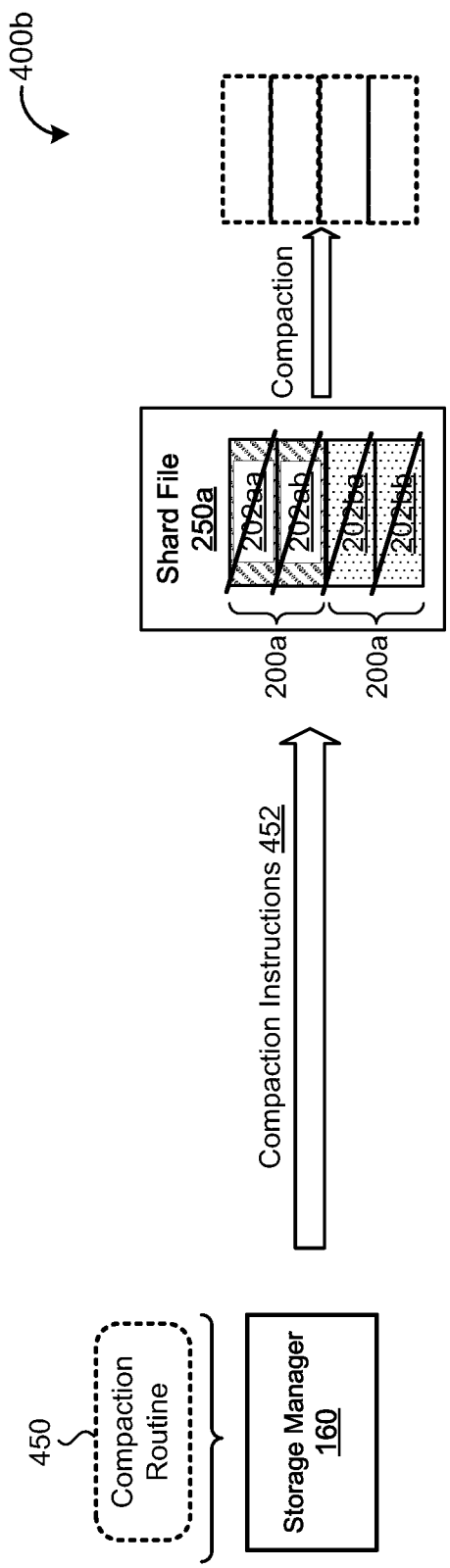

Referring to FIG. 4A, the storage manager 160 queries the storage abstraction 150 to obtain a distribution of predicted lifespans 282 for the data objects 200 (i.e., data objects 200a, 200b) written to the short-lived shard file 250a. Since all of the data objects 200 written to the short-lived shard file 250 include a predicted lifespan of less than two weeks, in some implementations, the storage manager 160 executes the compaction routine when all of predicted lifespans 220 for the data objects 200 written to the short-lived shard file 250a have expired. Accordingly, the storage manager 160 may determine when all of the predicted lifespans 220 of all of the data objects 200 (i.e., data objects 200a, 200b) by analyzing the distribution of predicted lifespans 282 obtained from the storage abstraction 150. In the example shown, the storage manager 160 executes the compaction routine 450 on the short-lived shard file 250a when the storage manager 160 determines that the predicted lifespans 220 of all of the data objects have expired.

Additionally or alternatively, the storage manager 160 may receive storage criteria 280 a shard file 250, regardless of the associated predicted lifespan range 260, that indicates a number or percentage of data objects 200 that have been deleted from the shard file. The storage criteria 270 may additionally or alternatively indicate a number of dead bytes associated with deleted data objects. The received storage criteria 270 may be satisfied when the number/percentage of deleted objects exceeds a storage threshold.

FIG. 4B shows the storage manager 160 executing the compaction routine 450 and sending compaction instructions 452 to the storage abstraction 150 to compact the short-lived shard file 250a by rewriting any remaining data objects 200a, 200b of the short-lived shard file 250a into a new shard file. In the example shown, all of the data objects 200a, 200b and constituent data chunks 202aa, 202ab, 202ba, 202bb have been deleted by their owner(s) 10 (e.g. via a delete request 115 (FIGS. 1A and 1B), and therefore, a single compaction recycles the entire shard file 250a without having to rewrite any remaining data objects into a new shard file 250.

Figure 4C:
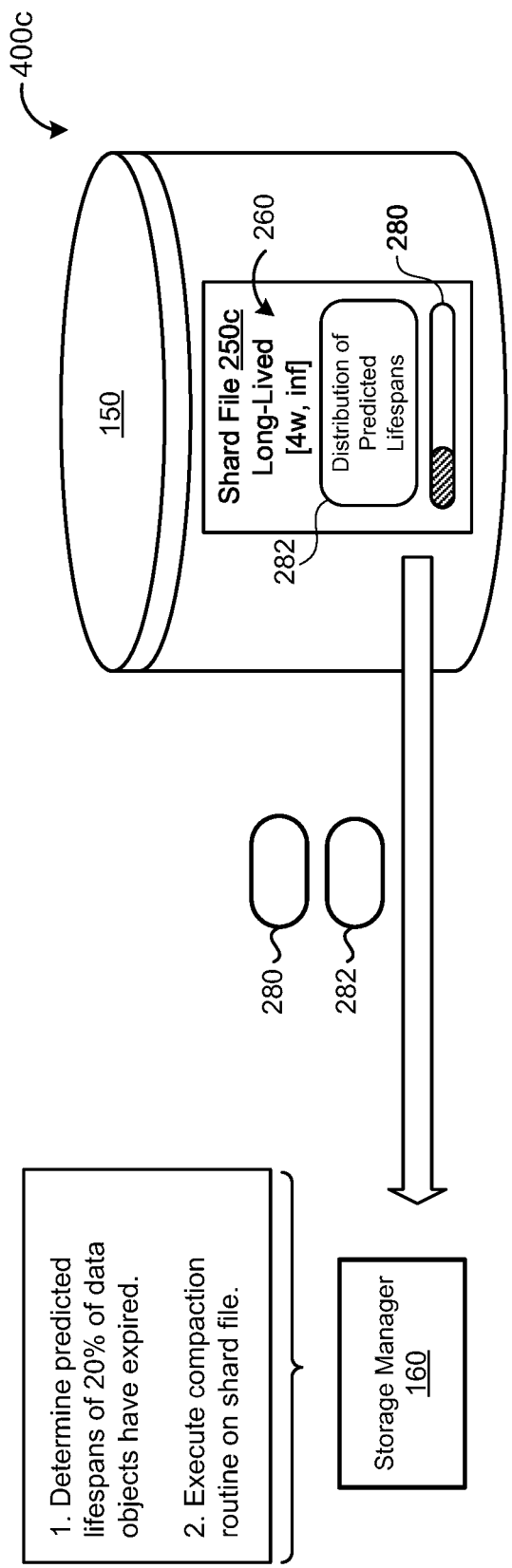
Figure 4D:
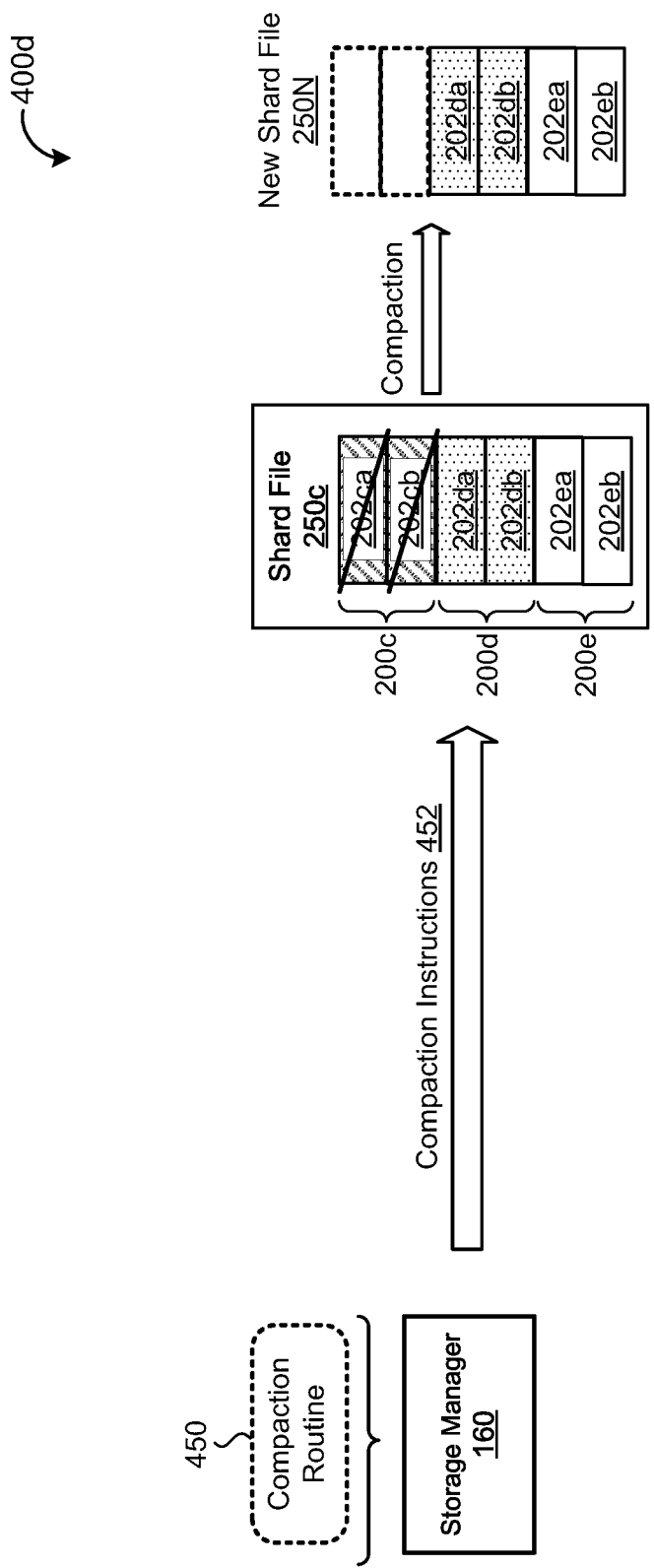

Referring to FIG. 4C, the storage manager 160 queries the storage abstraction 150 to obtain a distribution of predicted lifespans 282 for the data objects 200 (i.e., data objects 200c, 200d, 200e) written to the long-lived shard file 250c. Since the predicted lifespans 220 for the data objects 200 written to the long-lived shard file 250c may spread across a wide range (e.g., from four weeks to an infinite number of days), in some implementations, the storage manager 160 executes the compaction routine 450 during different trigger times each specifying when the predicted lifespans 220 for a threshold number/percentage of the data objects written to the long-lived shard file 250c have expired. For instance, the storage manager 160 may execute the compaction routine 450 when the predicted lifespans 220 for twenty-percent (20%) of the data objects have expired, when the predicted lifespans 220 for forty-percent (40%) of the data objects have expired, when the predicted lifespans 220 for sixty-percent (60%) of the data objects have expired, and when the predicted lifespans 220 for eighty-percent (80%) of the data objects have expired. Accordingly, the storage manager 160 may determine when the predicted lifespans 220 of various threshold numbers/percentages of data objects 200 (i.e., data objects 200c, 200d, 200e) have expired by analyzing the distribution of predicted lifespans 282 obtained from the storage abstraction 150. In the example shown in FIG. 4C, the storage manager 160 executes the compaction routine 450 on the long-lived shard file 250c when the storage manager 160 determines that the predicted lifespans 220 of twenty-percent (20%) of the data objects have expired.

FIG. 4D shows the storage manager 160 executing the compaction routine 450 and sending compaction instructions 452 to the storage abstraction 150 to compact the long-lived shard file 250c by rewriting any remaining data objects 200c, 200d, 200e of the long-lived shard file 250c into a new shard file 250N. In the example shown, all of the data object 200c and its constituent data chunks 202aa, 202ab, 202ba, 202bb have been deleted by their owner(s) 10 (e.g. via a delete request 115 (FIGS. 1A and 1B), and therefore, the storage manager 160 rewrites the non-deleted, remaining data objects 200d, 200e to the new shard file 250N. More specifically, the compaction includes the storage manager 160 identifying non-deleted, live chunks 202da, 202db, 202ea, 202eb that are constituents of the remaining data objects 202d, 202e of the long-lived shard file 250c, and associating (e.g. rewriting) the live chunks 202da, 202db, 202ea, 202eb with the new shard file 250N. The new shard file 250N includes a smaller size (e.g., in bytes) than that of the long-lived shard file 250c.

Figure 4E:
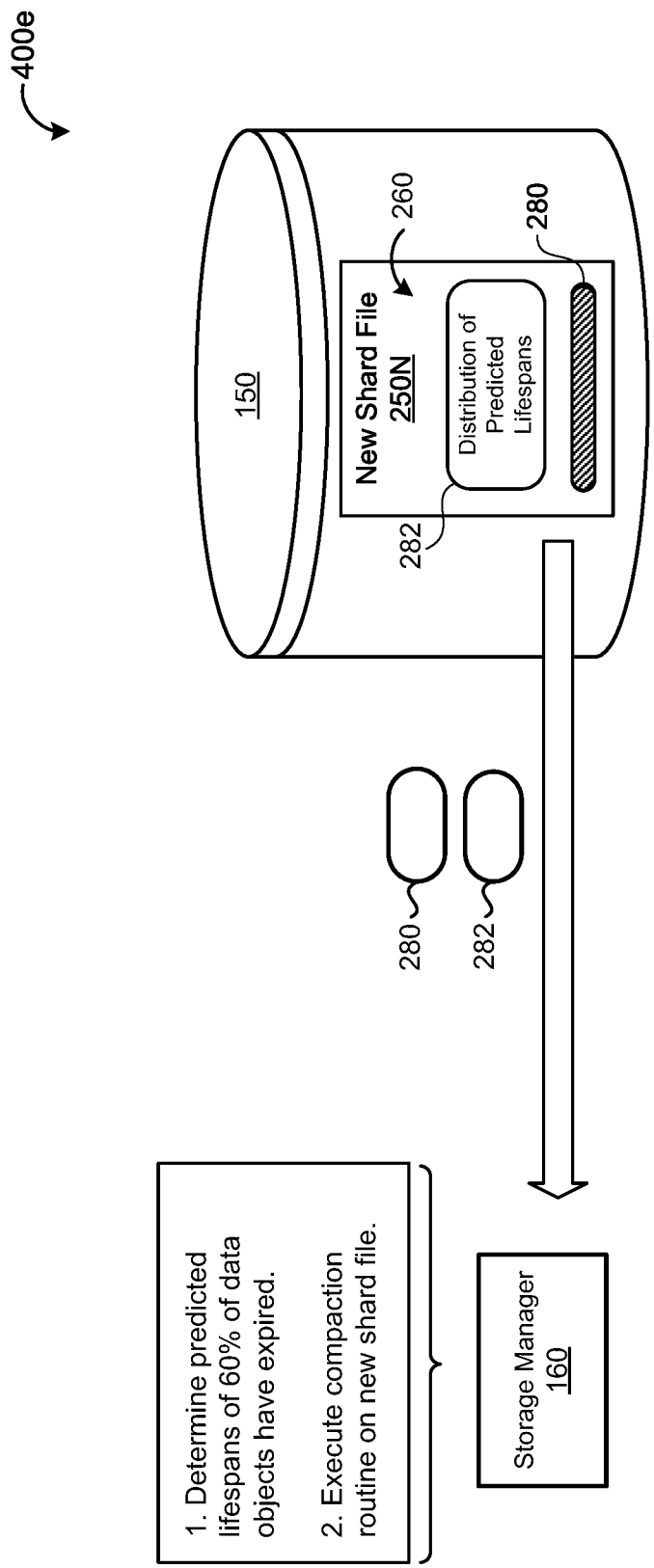

Referring to FIG. 4E, the storage manager 160 executes another compaction routine 450 when the storage manager 160 determines that the predicted lifespans 220 for 60% of the data objects 200 within the initial long-lived shard file 250c have expired. Here, the distribution of predicted lifespans 282 associated with the initial long-lived shard file 250c of FIG. 4C may be appended to the new shard file 250N. In other examples, the storage manager 160 may record the trigger events for each compaction routine 450 by initially obtaining the distribution of predicted lifespans 282 from the long-lived shard file 250c and then execute the compaction routine 450 upon the occurrence of those trigger events (e.g., predicted times). In the example shown, the storage criteria 270 reveals that all of the data objects 200d, 200e in the new shard file 250N have been deleted by their owner(s).

Figure 4F:
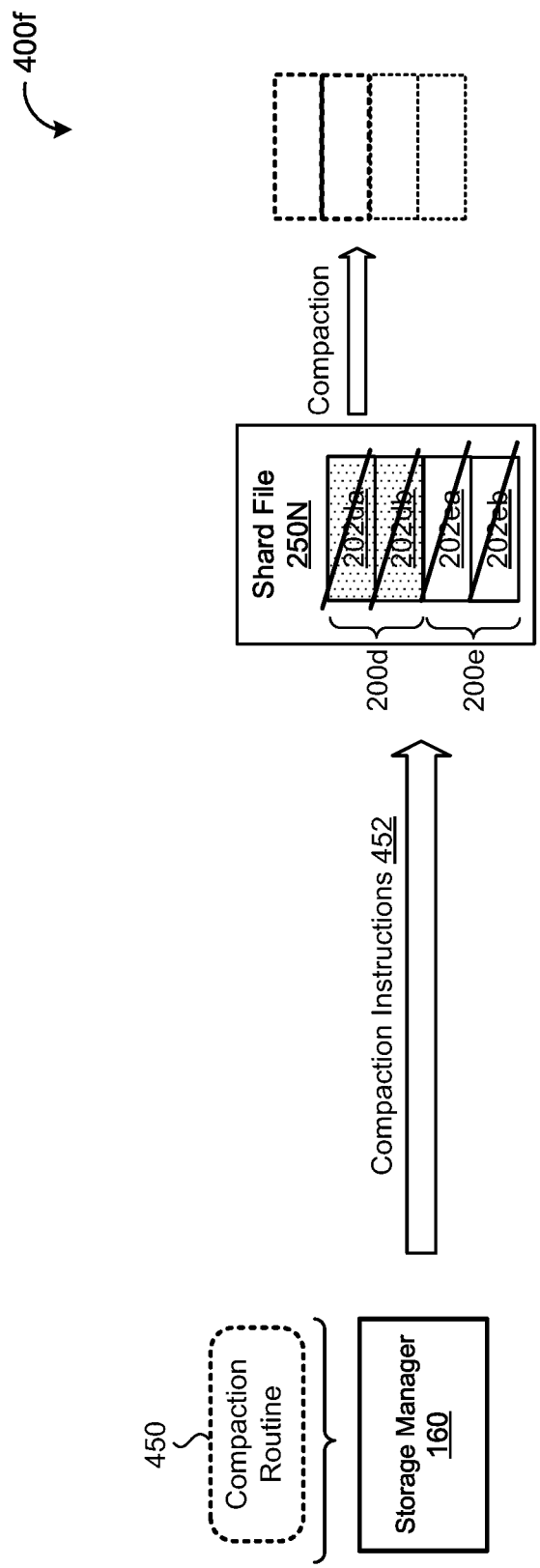

FIG. 4F shows the storage manager 160 executing the compaction routine 450 and sending compaction instructions 452 to the storage abstraction 150 to compact the new shard file 250N by rewriting any remaining data objects 200d, 200e of the new shard file 250N into another new shard file. In the example shown, all of the data objects 200d, 200e and constituent data chunks 202da, 202db, 202ea, 202eb have been deleted by their owner(s) 10 (e.g. via a delete request 115 (FIGS. 1A and 1B), and therefore, this compaction successfully recycles the entire new shard file 250N without having to rewrite any remaining data objects into a another new shard file 250. If, however, one of the data object 200d and/or data object 200e was not deleted, the compaction routine 450 would result in rewriting the non-deleted data object 200d, 200e to another new shard file 250 that would only include that data object 200d, 200e and its constituent data chunks 202.

Referring back to FIG. 1, in some implementations, the distributed storage system 150 implements an archive 190 (e.g., tape archive) configured to back-up uploaded data objects 200 for disaster recovery purposes. The archive 190 may include a long retention period (e.g., three (3) years). As many of the data objects 200 may be short-lived, or otherwise only live for a number of days that is significantly less than the retention period of the archive 190, a large fraction of data objects stored on in the archive 190 become garbage data due to deletion by their owner(s) 10. By writing data objects 200 into corresponding shard files 250 based on predicted lifespans 220, each shard file 250 is expected to have a respective longevity equal to the data object 200 with the longest predicted lifespan 220 within the shard file 250. Accordingly, similar to using multiple shard files 250 having associated predicted lifespan ranges 260, the distributed storage system 150 may include multiple archives 190 each having an associated retention period. For instance, the retention periods may range from short retention (e.g., 30 days) to long retention (e.g., 3 years). Thus, to maximize storage efficiency of the archives, each shard file 250 may get backed up to the archive 190 with the corresponding retention period based on an expected longevity of the shard file 250.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

Figure 5:
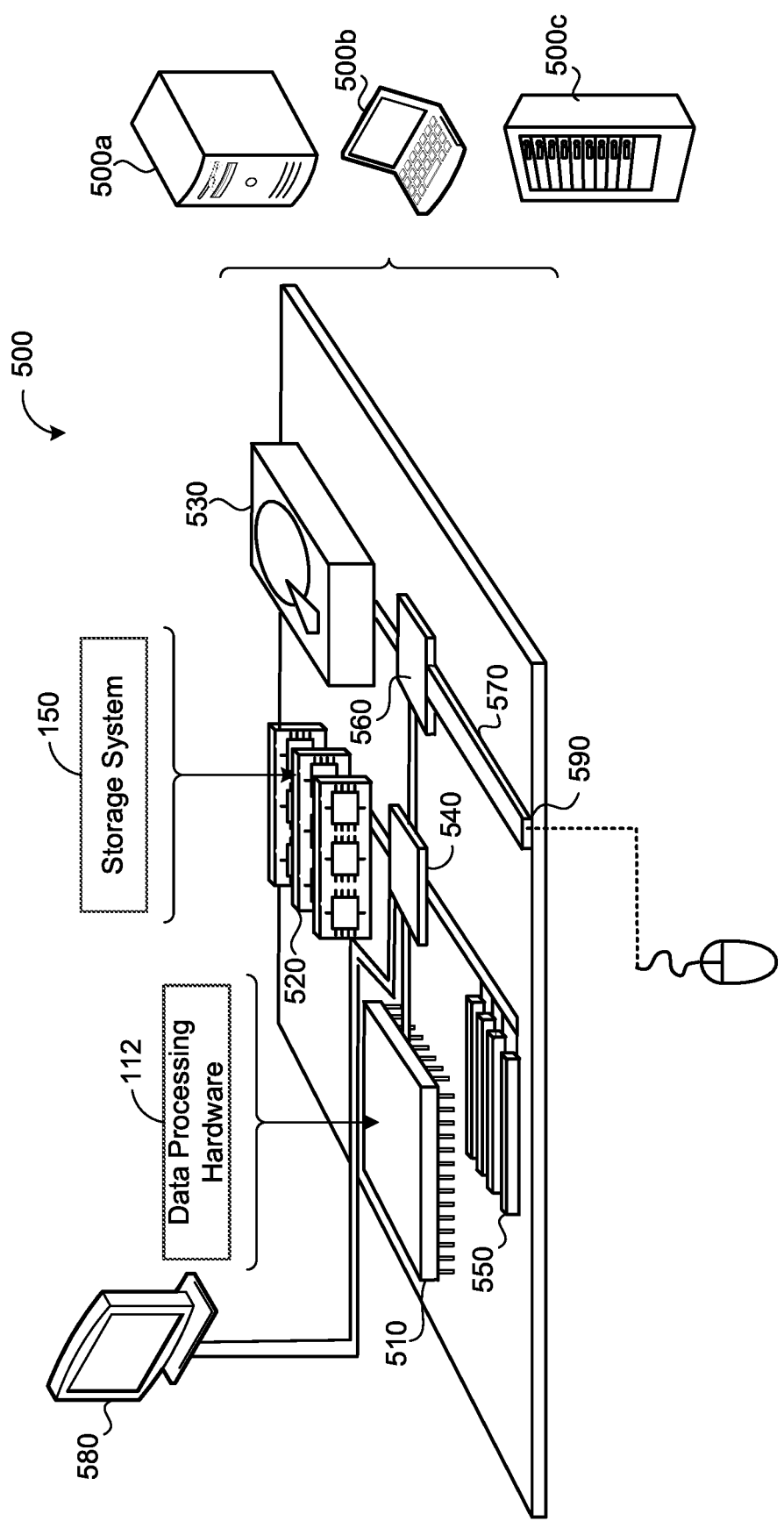
FIG. 5 is an example computing device.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510 (e.g., data processing hardware 112), memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 includes hardware (e.g., storage system 150) that stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Figure 6:
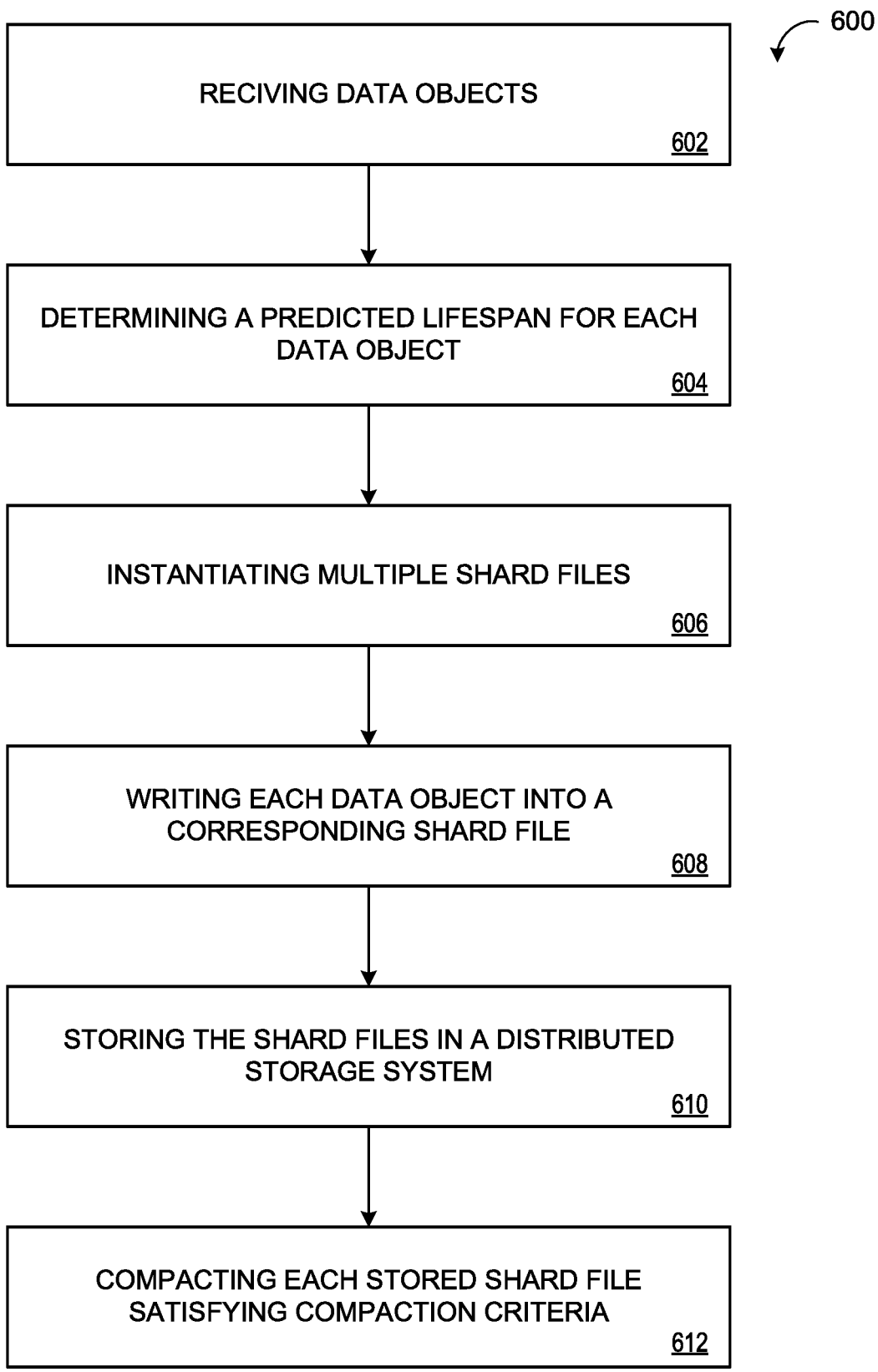
FIG. 6 is a flowchart of an example method for writing data objects into shard files based on predicted lifespans.

FIG. 6 is a flowchart of an example method 600 executed by the computing device 500 (e.g., data processing hardware 112) of FIG. 5 for writing data objects 200 into shard files 250 based on predicted lifespans 220. The flowchart starts at operation 602 with the data processing hardware 112 receiving data objects 200. The data processing hardware 112 may reside on a distributed system 140 (e.g., cloud environment). Client devices 120 associated with owners 10 of the data objects (also referred to blobs) may send an upload request 105 to the data processing hardware 112 to upload the data objects 200 for storage on a distributed storage system 150 (e.g. storage abstraction 150) of the distributed system 140.

At operation 604, the data processing hardware 112 determines a predicted lifespan 220 of each data object 200. The predicted lifespan 220 may include a predicted number of days the corresponding data object 200 is expected to live. In some examples, the data processing hardware 112 (via a lifespan predictor 162) determines the predicted lifespan 220 of a respective data object 200 based on at least one of a name (i.e., object identifier 210a) of the respective data object, a size 210b of the respective data object, a creation time 210c of the respective data object 200, a source 210d of the respective data object 200. Additionally or alternatively, the data processing hardware 112 may determine the predicted lifespan of the respective data object 200 based on a bucket identifier 154 identifying a bucket 152 in the storage abstraction 150 configured to hold the respective data object 200. In some implementations, the data processing hardware 112 determines the predicted lifespan 220 of a respective data object 200 by receiving features 320 of the respective data object, and classifying the respective data object 200 by executing a classifier on a machine learning model trained on a dataset of previously received data objects appended to previously stored shard files 250 using the respective features 320 as inputs for the classification. The machine learning model may include a random forest predictive model and/or a neural net based predictive model. The features 320 may include at least one of a bucket identifier 154 (e.g., bucket name) for the data bucket holding the respective data object 200, a historical lifespan pattern for past data objects in the data bucket 152, an upload time corresponding to when the respective data object 200 was uploaded to the data bucket 152, an upload location indicating a location of the respective data object within the distributed storage system 150, a size of the respective data object 200, or a storage class of the respective data object. Each storage class may have a different level of availability.

At operation 606, the data processing hardware 112 instantiates multiple shard files 250 each having an associated predicted lifespan range 260. At operation 608, the data processing hardware 112 writes each data object 200 into a corresponding shard file 250 having the associated predicted lifespan range 260 that includes the predicted lifespan 220 of the respective data object 200.

At operation 610, the data processing hardware 112 stores the shard files in the distributed storage system 150. Specifically, the data processing hardware 112 determines whether each instantiated shard file 250 satisfies a storage criteria 270, and for each shard file 250 that satisfies the storage criteria 270, the data processing hardware 112 stores the respective shard file 250 in the distributed storage system 150.

At operation 612, the data processing hardware 112 determines whether any stored shard files 250 in the distributed storage system 150 satisfy a compaction criteria 280 based on a number of deleted data objects 200 in each corresponding stored shard file 250. In some examples, the data processing hardware 112 obtains the distribution of predicted lifespans 282 of a respective stored shard file 250 and determines the compaction criteria 280 is satisfied when the predicted lifespans 220 of all, a majority, or some other threshold number/percentage of the data objects 200 in the respective stored shard file 250 have expired. For each stored shard file 250 satisfying the compaction criteria 280, the data processing hardware 112 compacts the stored shard file 250 by rewriting the remaining data objects 200 of the stored shard file into a new shard file 250N (FIGS. 4D-4F). For instance, the data processing hardware 112 may execute a compaction routine 450 to identify non-deleted, live data chunks 202 that are constituents of the remaining data objects 200 of the stored shard file 250, and associate (e.g., write) the non-deleted, live data chunks 202 with the new shard file 250N. In some configurations, the new shard file 250N is smaller than the compacted shard file 250. In other configurations, the new shard file 250N includes the live data chunks 202 written thereto as well as other non-deleted, love data chunks 202 that are constituents of remaining data objects 200 of a different stored shard file 250 also under compaction. In these configurations, the new shard file 250N may be larger, smaller, or the same size as the compacted shard files.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method comprising:
receiving, at data processing hardware, data objects, each received data object uploaded by a respective client device associated with a human user and associated with a respective data bucket identifier that identifies a respective data bucket the respective client device wants to hold the respective data object, the respective data bucket identifier being specific to the respective human user at a creation time of the respective data bucket;

for each received data object, determining, by the data processing hardware, a predicted lifespan of the respective data object based on a historical object lifespan table associated with the respective data bucket holding the respective data object, the respective data bucket created by the respective client device associated with the respective human user and the historical object lifespan table indicating a creation time for each past data object uploaded into the respective data bucket and a deletion timestamp indicating a time for each past data object that is deleted from the respective data bucket;

instantiating, by the data processing hardware, multiple shard files, each shard file immutable to accept new data objects once stored in a distributed storage system and having an associated predicted lifespan range;

writing, by the data processing hardware, each data object into a corresponding shard file having the associated predicted lifespan range that includes the predicted lifespan of the respective data object;

storing, by the data processing hardware, the shard files in the distributed storage system;

determining, by the data processing hardware, whether any stored shard files satisfy a compaction criteria based on the predicted lifespan range of each corresponding stored shard file; and for each stored shard files satisfying the compaction criteria, compacting, by the data processing hardware, the stored shard file by rewriting remaining data objects of the stored shard file into a new shard file.

2. The method of claim 1, wherein the predicted lifespan ranges of the shard files collectively cover zero to infinite days.

3. The method of claim 1, further comprising:
determining, by the data processing hardware, whether each shard file satisfies a storage criteria; and
for each shard file satisfying the storage criteria, storing, by the data processing hardware, the respective shard file in the distributed storage system.

4. The method of claim 3, wherein the storage criteria is satisfied when the respective shard file contains a threshold number of data objects or the respective shard file exists for a threshold period of time after instantiation.

5. The method of claim 1, wherein determining the predicted lifespan of the respective data object is further based on at least one of a source of the respective data object, a name of the respective data object, a size of the respective data object, or a creation time of the respective data object.

6. The method of claim 1, wherein determining the predicted lifespan of the respective data object comprises:
receiving features of the respective data object; and
classifying the respective data object by executing a classifier on a machine learning model trained on a dataset of previously stored data objects using the received features as inputs for the classification.

7. The method of claim 6, wherein the machine learning model comprises at least one of a random forest predictive model or a neural net based predictive model.

8. The method of claim 6, wherein the features comprise at least one of:
a historical lifespan pattern for past data objects in the data bucket;
an upload time corresponding to when the respective data object was uploaded to the data bucket;
a bucket location indicating a location of the respective data object within the distributed storage system;
an upload location indicating a geographical location of the respective data object when the respective data object was uploaded to the data bucket;
a size of the respective data object; or
a storage class of the respective data object, each storage class having a different level of data availability.

9. The method of claim 1, wherein the compaction criteria is satisfied when the associated predicted lifespan range of the stored shard file has expired.

10. The method of claim 1, wherein rewriting the remaining data objects of the stored shard file into the new shard file comprises:
identifying, by the data processing hardware, non-deleted, live data chunks that are constituents of the remaining data objects of the stored shard file; and
associating, by the data processing hardware, the non-deleted, live data chunks with the new shard file.

11. A system comprising:
data processing hardware; and
memory hardware in communication with the data processing hardware, the memory hardware storing instructions that when executed on the data processing hardware cause the data processing hardware to perform operations comprising:
receiving data objects, each received data object uploaded by a respective client device associated with a respective human user and associated with a respective data bucket identifier that identifies a respective data bucket the respective client device wants to hold the respective data object, the respective data bucket identifier being specific to the respective human user at a creation time of the respective data bucket;
for each received data object, determining a predicted lifespan of the respective data object based on a historical object lifespan table associated with the respective data bucket holding the respective data object, the respective data bucket created by the respective client device associated with the respective human user and the historical object lifespan table indicating a creation time for each past data object uploaded into the respective data bucket and a deletion timestamp indicating a time for each past data object that is deleted from the respective bucket;
instantiating multiple shard files, each shard file having an associated predicted lifespan range;
writing each data object into a corresponding shard file immutable to accept new data objects once stored in a distributed storage system and having the associated predicted lifespan range that includes the predicted lifespan of the respective data object;
storing the shard files in the distributed storage system;
determining whether any stored shard files satisfy a compaction criteria based on the predicted lifespan range of each corresponding stored shard file; and
for each stored shard files satisfying the compaction criteria, compacting the stored shard file by rewriting remaining data objects of the stored shard file into a new shard file.

12. The system of claim 11, wherein the predicted lifespan ranges of the shard files collectively cover zero to infinite days.

13. The system of claim 11, wherein the operations further comprise:
determining whether each shard file satisfies a storage criteria; and for each shard file satisfying the storage criteria, storing the respective shard file in the distributed storage system.

14. The system of claim 13, wherein the storage criteria is satisfied when the respective shard file contains a threshold number of data objects or the respective shard file exists for a threshold period of time after instantiation.

15. The system of claim 11, wherein determining the predicted lifespan of the respective data object is further based on at least one of a source of the respective data object, a name of the respective data object, a size of the respective data object, or a creation time of the respective data object.

16. The system of claim 11, wherein determining the predicted lifespan of the respective data object comprises:
   receiving features of the respective data object; and
   classifying the respective data object by executing a classifier on a machine learning model trained on a dataset of previously stored data objects using the received features as inputs for the classification.

17. The system of claim 16, wherein the machine learning model comprises at least one of a random forest predictive model or a neural net based predictive model.

18. The system of claim 16, wherein the features comprise at least one of:
   a historical lifespan pattern for past data objects in the data bucket;
   an upload time corresponding to when the respective data object was uploaded to the data bucket;
   a bucket location indicating a location of the respective data object within the distributed storage system;
   an upload location indicating a geographical location of the respective data object when the respective data object was uploaded to the data bucket;
   a size of the respective data object; or
   a storage class of the respective data object, each storage class having a different level of data availability.

19. The system of claim 11, wherein the compaction criteria is satisfied when the associated predicted lifespan range of the stored shard file has expired.

20. The system of claim 11, wherein rewriting the remaining data objects of the stored shard file into the new shard file comprises:
   identifying, by the data processing hardware, non-deleted, live data chunks that are constituents of the remaining data objects of the stored shard file; and
   associating, by the data processing hardware, the non-deleted, live data chunks with the new shard file.

* * * * *